Sept. 28, 1926.  
R. O. WISMER ET AL  
1,601,014  
CONTROLLING APPARATUS FOR LIGHT PROJECTORS  
Filed April 14, 1922   3 Sheets-Sheet 1
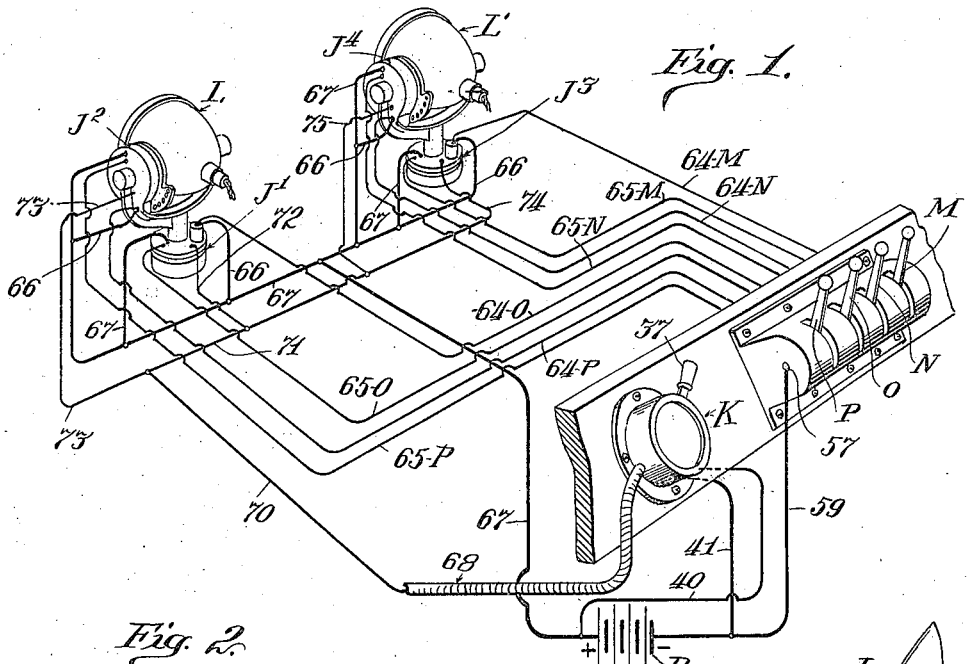
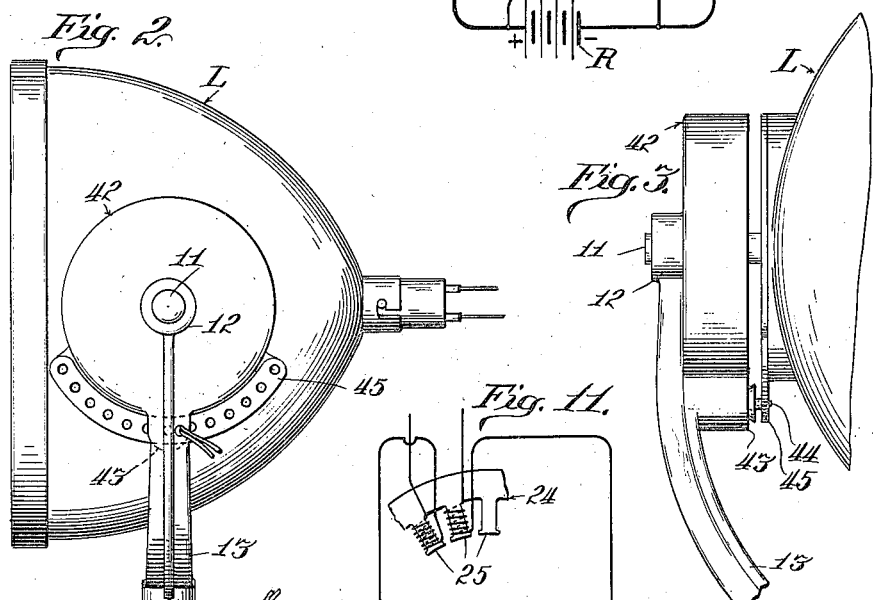
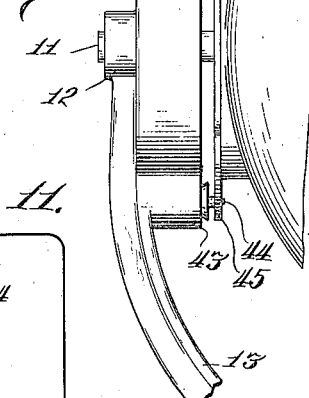
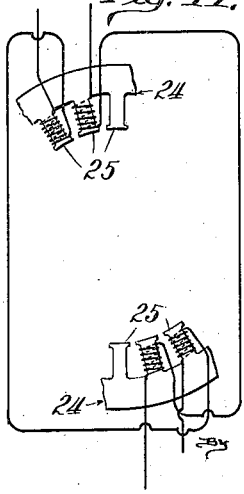

Sept. 28, 1926.  
R. O. WISMER ET AL  
1,601,014  
CONTROLLING APPARATUS FOR LIGHT PROJECTORS  
Filed April 14, 1922  3 Sheets-Sheet 2

Witness  
Milton Lenoir

Inventors  
Richard O. Wismer,  
Lewis C. Rice,  
Adams & Jackson.  
Attorneys

Sept. 28, 1926.
R. O. WISMER ET AL
1,601,014
CONTROLLING APPARATUS FOR LIGHT PROJECTORS
Filed April 14, 1922　　3 Sheets-Sheet 3
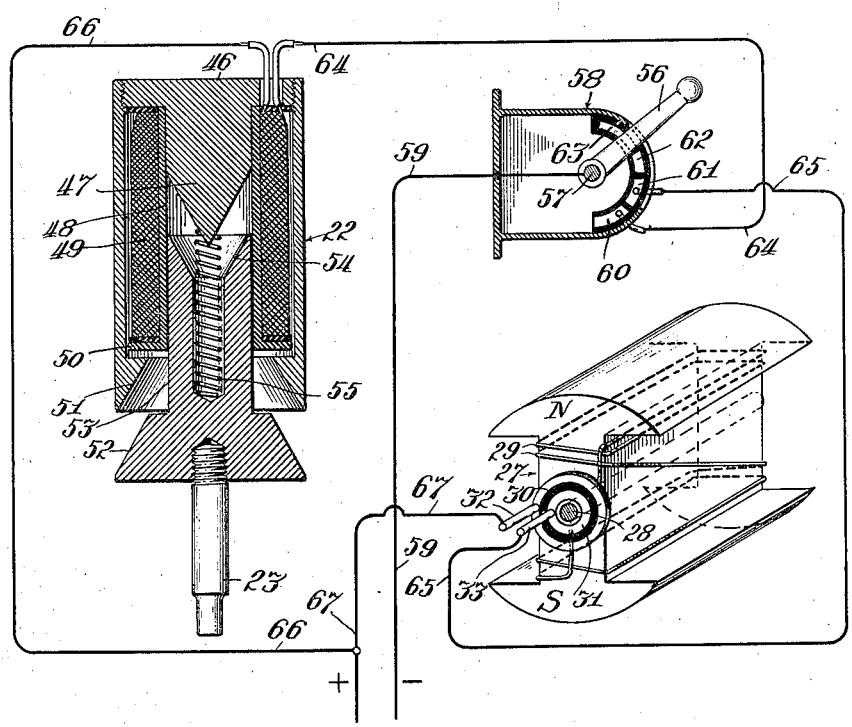
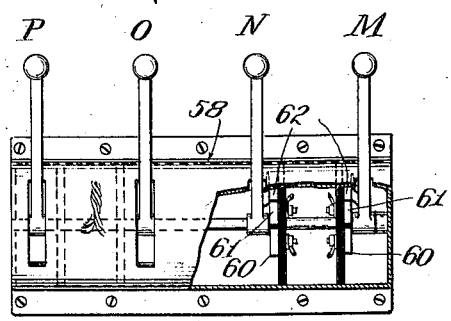
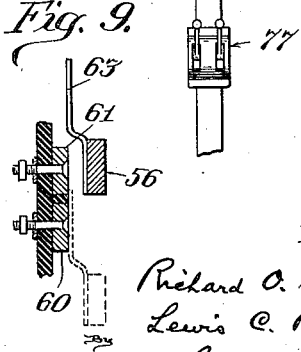
Inventors.
Richard O. Wismer,
Lewis C. Rice,
Adams Jackson.
Attorneys Patented Sept. 28, 1926.

1,601,014

UNITED STATES PATENT OFFICE.

RICHARD O. WISMER AND LEWIS C. RICE, OF FORT WAYNE, INDIANA, ASSIGNORS TO SAID LEWIS C. RICE.

CONTROLLING APPARATUS FOR LIGHT PROJECTORS.

Application filed April 14, 1922. Serial No. 552,510.

Our invention has to do with controlling the position of a light projector, such as an automobile head light, so that the beam of light may be directed to one side or the other of its normal position, or up or down, from a more or less distant point. For example, in the case of automobile head lights it is desirable that the light be capable of being directed toward one side of the road or the other, especially in turning corners or where the roadway is not straight, or of being thrown up or down where the road is not level, or where other conditions make it expedient to vary the point at which the greatest illumination is obtained. For obvious reasons it is necessary that the driver be enabled to control the direction in which the light is thrown from his seat and without stopping the vehicle, and to provide an apparatus which will satisfy these requirements is the object of our present invention. We accomplish this object as hereinafter described and as illustrated in the drawings, in which we have shown our invention embodied in an apparatus designed to control the position of the headlights of an automobile, but it should be understood that it may be applied to other lamps as well as headlights, and may be employed in many situations other than for automobiles,—in fact wherever it is desirable to control the position of a light projector from a point more or less remote from it. What we regard as our invention is set forth in the claims.

In the accompanying drawings,—

Fig. 1 is a diagrammatic view showing one form in which the several parts of the apparatus may be assembled in connection with the headlights of an automobile;

Fig. 2 is a side elevation of one of the headlights, some parts of the controlling mechanism being in section;

Fig. 3 is a partial rear elevation of one of the headlights;

Fig. 7 is a diagrammatic view showing one of the locking solenoids and one of the selective switches in section, and the armature of one of the operating motors in perspective;

Fig. 8 is an elevation, partly broken away, showing a series of selective switches;

Fig. 9 is a sectional view of one of said switches;

Fig. 10 is a view of part of the steering post of an automobile illustrating the manner in which the selective switches can be mounted thereon; and Fig. 11 is a diagrammatic view showing a modified arrangement which may be used in wiring the operating motors in lieu of that shown in Fig. 4.

Figure 4:
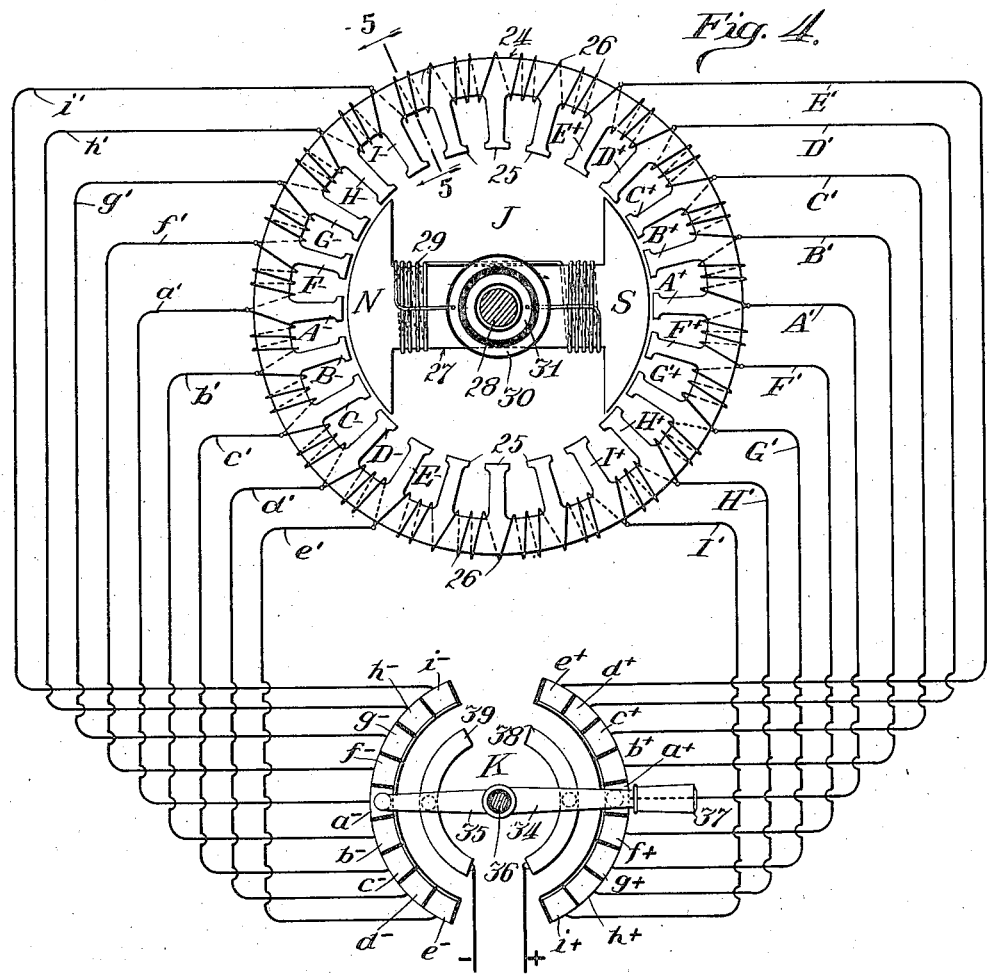
Fig. 4 is a wiring diagram showing one of the operating motors and the main operating switch.

The apparatus illustrated comprises two headlights which are so mounted as to be capable of turning about a vertical axis to throw the beam of light to one side or the other, and also about a horizontal axis so that the beam may be swung either up or down, and this turning may be about either one of these axes alone, or about both at the same time, or consecutively. These movements of the headlights are effected electrically by means of two small electric motors associated with each head light, one of which effects its rotation about a vertical axis and the other that about its horizontal axis, and the energization of these motors is accomplished by means of a main operating switch placed so as to be conveniently accessible to the driver, preferably on the usual instrument board. In addition to this main operating switch there are associated with each headlight two selective switches, one of which controls the movement of the head light about one of its axes and the other that about its other axis. In other words, if the selective switch which controls the lateral swinging of the headlight is alone operated and this is followed by the operation of the main switch the headlight will swing about its vertical axis alone, the direction in which it swings being determined by the direction in which the main switch is moved. On the other hand, if the other selective switch is operated alone, then when the main switch is operated the headlight will swing about its horizontal axis and not about its vertical axis. By operating both selective switches the headlight will swing about both axes when the main operating switch is moved from its neutral position. Furthermore, if one of the selective switches of one headlight only is actuated, then when the main operating switch is actuated that headlight only will move, but if a selective switch of each of the head lights is actuated then both headlights will move when the main operating switch is actuated. With this general statement of the manner in which the headlights are controlled, we shall now proceed with a detailed description of the embodiment of our invention illustrated in the drawings, which, however, is only one of several ways in which our invention may be applied.

In the drawings, L, L' indicate two headlights, the mounting of which is in all respects the same, so that a description of one will suffice for both. Each of these head lights is mounted upon trunnions 11 fitted in suitable bearings 12 in the arms 13 of a forked bracket, the lower end portion of which is provided with a spindle 14, as best shown in Fig. 2. This spindle extends through a motor-containing case 15 which is provided with a boss 16 having a socket to receive the lower end of said spindle so that it is supported in a vertical position. Preferably ball-bearings 17 are fitted in said socket under the lower end of said spindle. The boss 16, in the construction shown, is fitted upon the upper end of a post 18 secured in any suitable way to the vehicle. It will be understood that the case 15 does not rotate as it is fixedly secured to the post 18, preferably by a setscrew 19 shown in Fig. 2. Mounted upon the spindle 14 above the case 15 is a plate 20 which is secured to said spindle so that it rotates therewith about a vertical axis. This plate overlies the cover 21 of the case 15 and carries a locking magnet or solenoid 22 which comprises a downwardly-projecting locking pin 23 which projects through a hole in the plate 20 near the margin thereof and is adapted to enter any one of a number of holes in the cover plate 21 arranged in the form of an arc so that they are adapted to be brought into registry with the pin 23 by the rotation of the plate 20 about its axis. The construction of the locking solenoid 22 will be more specifically hereinafter described, and for present purposes it will suffice to call attention to the fact that by means of the pin 23 the headlight may be locked against swinging about a vertical axis and be held fixedly in the different positions to which it may have been swung. By withdrawing the pin 23 from engagement with the cover plate 21, however, the plate 20 may be released so as to permit the headlight to be swung laterally upon the spindle 14 as an axis.

Figure 5:
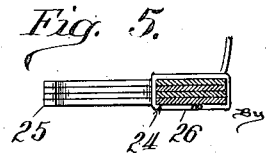
Fig. 5 is a section on line 5—5 of Fig. 4 showing the field magnet construction.

The mechanism by which the spindle 14, with the projector carried by it, is rotated in either direction within the range of its movement comprises a two-pole two-circuit motor, the construction of which is best shown in Fig. 4. As there shown J indicates the motor as a whole, which comprises a multipolar ring field magnet 24 composed of a plurality of thin plates having inwardly projecting poles 25, as shown in Figs. 4 and 5. The field magnet 24 carries a number of coils 26 connected in series, one of said coils being placed between each pair of poles 25, as illustrated in Fig. 4, or if desired each pair of diametrically opposite poles 25 may be provided with coils connected in series and disconnected from the coils of the other poles as illustrated diagrammatically in Fig. 11. Mounted within the field magnet 24 is a two-pole armature 27, the poles of which are indicated by N, S in Fig. 4. As there shown these poles are segmental in form so that they are adapted to be acted upon by a plurality of poles 25 at the same time. The armature 27 is mounted upon a shaft 28 so that it is capable of rotating, but the field magnet 24 is mounted in a fixed position. 29 indicates a coil wound upon the intermediate portion of the armature 27, the ends of said coil being connected, respectively, to collecting rings 30, 31 carried by the shaft 28 adjacent to one end thereof and insulated therefrom, as shown in Figs. 4 and 7. Referring to the latter figure, 32, 33 indicate brushes which bear on the collecting rings 30, 31, respectively, the brush 32 being connected with a suitable source of electric current, while the brush 33 is connected with suitable switch mechanism, to be described later, through which it is either grounded or connected to the opposite terminal of the source of electric current which supplies the brush 32. It should be explained in this connection that the illustration in Fig. 7 shows the armature 27 as being much longer than it actually is in the apparatus shown in Figs. 1, 2 and 3, its length being exaggerated in Fig. 7 for clearness of illustration.

Referring again to Fig. 4, K indicates the main operating switch as a whole, which switch comprises two alined circuit closing arms 34, 35 mounted upon an insulated from a shaft 36. The arm 34 is preferably provided with a handle 37, and said arms are connected so that they swing in unison. The arm 34 extends over and engages a segmental plate 38, and also a segmental distributing member comprising a series of contacts indicated, respectively, by reference letters $a+$, $b+$, $c+$, $d+$, $e+$, $f+$, $g+$, $h+$, $i+$, the contact $a+$ being in the center. In like manner the arm 35 extends over and engages a segmental plate 39 and also a segmental distributing member comprising a series of contacts indicated, respectively, by reference letters $a-$, $b-$, $c-$, $d-$, $e-$, $f-$, $g-$, $h-$, $i-$, the latter contacts being diametrically opposed to the correspondingly-lettered + contacts. It will be evident, therefore, that when the arms 34, 35 are in the position shown in Fig. 4 arm 34 will connect contact a+ with contact plate 38, and arm 35 will connect contact a— with contact plate 39. Also that by swinging the arms 34, 35 about the shaft 36 as an axis any desired contact of the + sign may be connected with contact plate 38 and at the same time the corresponding contact of the — sign be connected with contact plate 39. 40, 41 indicate wires leading from a suitable source of electric current to the contact plates 38, 39, respectively; and A′, B′, C′, D′, E′, F′, G′, H′, I′ indicate a series of wires connecting the several contacts a+, b+, c+, d+, e+, f+, g+, h+, i+, respectively, with the coils 26 of the field magnet 24 disposed adjacent to the series of poles indicated by the letters A+, B+, C+, D+, E+, F+, G+, H+, I+, respectively. In like manner the several contacts a—, b—, c—, d—, e—, f—, g—, h—, i— are connected to coils 26 adjacent, respectively, to the opposite poles A—, B—, C—, D—, E—, F—, G—, H—, I— by a series of wires indicated by a′, b′, c′, d′, e′, f′, g′, h′, i′, respectively. Each of the segments of the main controlling switch, therefore, is connected with a corresponding coil of the field magnet, and the energization of the several poles of the field magnet may be controlled by swinging the handle 37 about its axis. When the handle stands in its intermediate position, so that the arms 34, 35 bear respectively on the contacts a+ and a—, the armature 27 will stand in the position shown in Fig. 4, and when said handle is moved in either direction from the position shown in said figure the armature 27 will be rotated in a corresponding direction and to the same extent. Of course, by turning the handle 37 to a position where it does not contact with any of the contacts of the main switch no current will flow through the coils of the field magnet. It will be understood that a single main controlling switch may be in like manner connected with the field magnets of several motors so that a single switch lever or handle 37 may control all of them at the same time, but as to illustrate such connections would cause confusion the connections of only a single motor have been shown. As will be explained presently, the arrangement shown in Fig. 1 requires four of such motors, but the operation of all is controlled by a single controlling switch such as that described.

One of the motors J is provided on each spindle 14, as shown in Fig. 2, and in like manner one of said motors is mounted in a case 42 carried by one of the arms 13 of each of the forked brackets which support the headlights, as shown in Figs. 1 and 3. In this case the armature is mounted upon and rotates with one of the trunnions 11 so that its rotation is about a horizontal axis and it serves as a means of deflecting the beam of light up or down. The locking arrangement in this case is similar to that already described, but differs from it in that the locking solenoid is fitted in a projecting portion 43 of the case 42 so that its locking pin 44 projects laterally and is adapted to engage any of a series of holes in the marginal portion of a segmental plate 45 secured at one side of the headlight L or L′, as the case may be, so as to rotate therewith, as shown in Fig. 3. It will be evident that when the pin 44 is in engagement with one of the holes in the plate 45 the trunnion 11, and the headlight supported thereby cannot rotate even should the motor in the case 42 be energized, but by withdrawing said pin from engagement with said plate the projector is left free to swing either up or down in accordance with the direction in which the armature of the motor is rotated.

The construction of the locking magnets or solenoids is best shown in Fig. 7, from which it will be seen that each of said solenoids comprises a cylindrical shell, preferably of iron, in one end of which is screwed an iron plug 46 having a central conical projection 47 tapered to a point, preferably at an angle of sixty degrees. This projection fits in the bore of a thin brass tube 48 of considerably less diameter than the interior diameter of the shell of the solenoid, which tube has wound upon it a coil 49. At the lower end of said tube is an outwardly-projecting annular flange 50 which serves to hold the coil 49 in place. The opposite end of the shell 22 is internally tapered, as shown at 51 in Fig. 7, to receive a tapered head 52, which forms the outer end of a core 53, loosely fitted in the bore of the tube 48 so that it is capable of reciprocating freely in said tube. At its inner end the core 53 is internally tapered, as best shown at 54, to conform to the taper of the projection 47, and it is also bored centrally to form a pocket to receive a coiled spring 55, one end of which is seated in said core while its opposite end fits upon the pointed end of the projection 47. The spring 55 tends to project the core 53, but when the coil 49 is energized the core 53 is drawn into it against the tension of said spring. The locking pin 23 is screwed into the head 52, as shown in Fig. 7, and consequently moves with the core of the solenoid when that is actuated. In the illustration the core is shown as projected much further than it would be in actual use, to more clearly show its construction.

The construction of the several selective switches, which are all alike, is best shown in Figs. 7, 8 and 9. Each of said switches comprises an arm 56 mounted upon a shaft 57 which extends longitudinally through a suitable case or housing 58, which is adapted to support and enclose said shaft and the several switches associated therewith. This housing is preferably made of conducting material and the shaft 57 is not insulated therefrom, so that it forms a ground connection at the axis of each of the several arms 56. If desired, however, the shaft 57 may be connected with a wire 59 leading either to the frame of the machine or to one of the terminals of a storage battery. The arm 56 is adapted to be moved into contact with any one of three contacts 60, 61 or 62 carried by an insulated disc 63. The arm 56 also carries a laterally-projecting contact 63, the purpose of which is to make contact with contact 61 when the arm 56 is in contact with contact 60. The contact 60 is connected by a wire 64 with one of the terminals of the solenoid coil 49, and the contact 61 is connected by a wire 65 with the brush 33, as shown in Fig. 7. The contact 62 is simply an insulated plate that serves as a resting point for the arm 56. 66 indicates a wire which is connected with the opposite terminal of the solenoid coil 49 and leads to wire 67 communicating with the source of electric current. The wire 67 is also connected with the brush 32. For convenience of reference M, N, O, P represent the several selective switches as a whole, as shown in Figs. 1 and 8, and as no doubt will be understood from what has been said, each of said switches is connected with a different locking magnet and with the armature coil of the motor with which such locking magnet is associated. This is illustrated in Fig. 1, in which the wires 64 connecting the contacts 60 of the several selective switches to one of the terminals of the appropriate locking magnet are indicated by 64$^M$, 64$^N$, 64$^O$, and 64$^P$, respectively, and the wires 65 connecting the segments 61 of the several selective switches to the brushes 33 of the appropriate armatures are indicated by 65$^M$, 65$^N$, 65$^O$, 65$^P$, respectively. The wire 59, which is connected with the selective switch shafts 57 is shown as leading to the negative side of a storage battery R to which also the wire 41 leading to the main operating switch is connected. The opposite terminal of said battery is shown connected by wire 40 to the main operating switch K, and also by wire 67 to the armature brushes 32. The wire 67 is also connected by wires 66 with the opposite terminals of the locking magnets, as shown in Figs. 1 and 7. The entire series of wires leading from the main operating switch K is shown in Fig. 1 as being enclosed in a cable 68 which in Fig. 1 is diagrammatically represented by lines 70, 71 and 72 as connected with the motor J$^1$ which controls lateral swinging of the projector L. Line 73 in said figure indicates the connection of the cable 70 with motor J$^2$ which controls the vertical swinging of projector L. Line 74 indicates the connection through line 71 of cable 70 with the motor J$^3$ which controls lateral swinging of projector L', and line 75 indicates the corresponding connection with motor J$^4$ which controls vertical swinging of said projector. It will be understood, of course, that each of the motors J$^1$, J$^2$, J$^3$, and J$^4$ is connected with the main controlling switch K in the manner illustrated in Fig. 4, and that the illustration of Fig. 1 is merely typical since it would be impracticable to show the several series of wires in detail. It will be apparent that by this arrangement whenever the handle 37 of the main switch K is moved to alter the connections between the several contacts of said switch and the contact plates 38, 39, the energization of the poles of all the motors J$^1$, J$^2$, J$^3$, and J$^4$ will be correspondingly varied, and consequently if the armature coil 29 has been previously energized the armature will be correspondingly moved, provided it has been unlocked. By reference to Figures 7 and 8 it will be seen that when any one of the selective switch levers 56 is moved down from the position shown in Fig. 7 until it engages contact 60, at which time its laterally projecting plate 63 will bear upon contact 61, a closed circuit will be established through the coil 49 of the corresponding locking magnet, and at the same time a closed circuit will be established through the coil 29 of the corresponding armature. The energization of the locking magnet coil 49 will withdraw the pin 23 connected with the core thereof, thereby releasing the projector so that it may swing laterally or vertically, depending upon which locking magnet has been actuated. At the same time the energization of the armature coil 29 will magnetize the poles of said armature, which will consequently coact with the poles of the field magnet of its motor to hold the projector in statu quo. If then the main operating switch be moved into contact with any of the contacts associated therewith the poles of the several field magnets will be correspondingly energized, with the result that the armature which has been unlocked will swing correspondingly while those which have not been unlocked will remain stationary. The extent to which any given projector may be swung may, therefore, be accurately and instantly controlled by means of the main operating switch. After the projector has been brought to the desired position it may be locked in such position by returning the appropriate selective switch lever 56 to its neutral position shown in Fig. 7, thereby cutting off the current from the coil 49, whereupon the locking pin 23 connected with the core of such coil will be projected to its operative position under the influence of the spring 55. It will be noted that when any one of the selective switch levers is moved from the position shown in Fig. 7 toward contact 60 it will first come into engagement with contact 61. When this occurs the appropriate locking magnet will not be energized, but a closed circuit will be established through the coil 29 of the appropriate armature, thereby magnetizing the poles of such aramature and producing by magnetic induction polarities of opposite sign in the corresponding field magnet. The poles of the armature will, accordingly, be strongly attracted by the opposite poles of the field-magnet, and, therefore, it will be held steady in its original position until and after the selective switch lever is moved into engagement with contact 60, and the locking magnet is thereby actuated to move its locking pin 23 out of operative position. The position of the projector accordingly will not be shifted until the main controlling switch is operated in the manner above described. Preferably the several selective switch levers are so arranged that the corresponding levers of the two headlights are in juxtaposition in order that they may both easily be actuated at the same time and thereby bring about a corresponding movement of both headlights when the main controlling switch is operated, but this is not essential as the same ultimate result may be obtained by operating them separately.

The selective switches may, if desired, be mounted on the instrument board, as shown in Fig. 1, or if preferred they may be mounted on a steering post 76 as shown in Fig. 10, in which I have shown a case 77 designed for two selective switches, such as could well be used for controlling the position of a spotlight.

Figure 6:
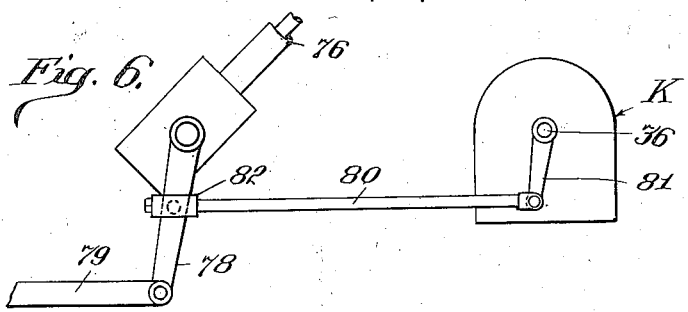
Fig. 6 is a diagrammatic view showing the manner in which our improved controlling mechanism may be connected up with the steering gear of an automobile.

In Fig. 6 we have shown an arrangement designed for use where it is desired to swing the headlights laterally to correspond with the turning of the steering wheels so that the lateral deflection of the beam of light may be effected automatically. In the arrangement there shown 76 indicates the steering column, which, as usual, operates to swing a crank arm 78 connected by a connecting bar 79 with the steering connections of the front wheels. This crank arm is connected by a connecting rod 80 with a crank 81 mounted on the shaft 36 of the main controlling switch K so that by rocking said shaft the contact arms 34, 35 may be swung to conform to the change in direction of the wheels. When this arrangement is used the appropriate selective switches may either be left in their operative position so that the lamps are unlocked, to leave them free to swing horizontally, or, if desired, such selective switches may be operated manually to lock or release the lamps as occasion requires. The forward end of the connecting rod 80 is preferably adjustably connected to the crank arm 78 by a clamp 82 so that the extent to which the crank 81 will be actuated by a given movement of the crank arm 78 may be varied.

The feature of associating selective controlling devices for determining which of several projectors is to be affected, or the direction in which the beam of light is to be deflected, with a main actuating device by which the change in direction is accomplished, is believed to be broadly new, as well as the use of electrically operated mechanism for this purpose. It will be understood, of course, that instead of operating the several switches by hand they may be so located as to be operated by the foot, and the term "manually" is not, therefore, used in a restricted sense.

What we claim as our invention and desire to secure by Letters Patent, is—

1. The combination with a pivotally mounted light projector, of a stationary field magnet comprising an annulus concentric with the axis of said projector and having a plurality of radially disposed poles, a two-pole armature fixed on the axis of said projector and adapted to rotate within said poles, a coil on said armature, a main switch for controlling the energization of the poles of the field magnet, and a separate switch for controlling the energization of the armature coil.

2. The combination with a pivotally mounted light projector, of a stationary field magnet comprising an annulus concentric with the axis of said projector and having a plurality of radially disposed poles, a two-pole armature fixed on the axis of said projector and adapted to rotate within said poles, a coil on said armature, a main switch comprising contacts of opposite sign connected respectively with diametrically opposite poles of said field magnet and a circuit closing device, and a separate switch for energizing the armature coil.

3. The combination with a pivotally mounted light projector, of a stationary field magnet comprising an annulus concentric with the axis of said projector and having a plurality of radially disposed poles, a two-pole armature fixed on the axis of said projector and adapted to rotate within said poles, a coil on said armature, a main switch for controlling the energization of the poles of the field magnet, an electrically controlled locking device for locking the projector against rotation, and a separate switch for closing the circuit through said armature coil and actuating said locking device to permit rotation of the projector.

4. The combination with a pivotally mounted light projector, of a stationary field magnet comprising an annulus concentric with the axis of said projector and having a plurality of radially disposed poles, a two-pole armature fixed on the axis of said projector and adapted to rotate within said poles, a coil on said armature, a main switch for controlling the energization of the poles of the field magnet, an electrically controlled locking device for locking the projector against rotation, a separate switch, and means actuated by the latter switch for first energizing the armature coil and then unlocking the projector to permit rotation thereof.

RICHARD O. WISMER.
LEWIS C. RICE.